(12) United States Patent
Footz et al.

(10) Patent No.: US 12,077,370 B2
(45) Date of Patent: Sep. 3, 2024

(54) BEVERAGE POD (71) Applicant: G-PAK Technology Inc., Surrey (CA)

(72) Inventors: Darren Joseph Footz, Surrey (CA); Seth Melvin Cronin, Essex Junction, VT (US); Zachary Michael Hudson, Vancouver (CA); Kianoush Karimi Pour Kerman, Vancouver (CA)

(73) Assignee: Nexe Innovations Inc., Windsor (CA)

( * ) Notice: Subject to any disclaimer, the term of this patent is extended or adjusted under 35 U.S.C. 154(b) by 0 days.

(21) Appl. No.: 17/316,135

(22) Filed: May 10, 2021

(65) Prior Publication Data
US 2021/0347558 A1    Nov. 11, 2021

Related U.S. Application Data (60) Provisional application No. 63/022,163, filed on May 8, 2020, provisional application No. 63/051,665, filed on Jul. 14, 2020.

(51) Int. Cl.
B65D 85/804    (2006.01)
A47J 31/40    (2006.01)

(52) U.S. Cl.
CPC ........ B65D 85/8067 (2020.05); A47J 31/407 (2013.01); B65D 85/8061 (2020.05)

(58) Field of Classification Search
CPC ......................................... B65D 85/804–8067
See application file for complete search history.

(56) References Cited

U.S. PATENT DOCUMENTS

| 10,717,593 B1 * | 7/2020 | Scialdone | ........... B65D 85/8067 |
| 2014/0272016 A1 * | 9/2014 | Nowak | ..................... A23L 2/52 426/112 |

* cited by examiner

Primary Examiner — Drew E Becker
Assistant Examiner — Chaim A Smith
(74) Attorney, Agent, or Firm — Perkins Coie LLP (57) ABSTRACT Single-serving beverage pods can include a first chamber operable to contain a dry beverage material and a second chamber operable to contain a second beverage material. A seal layer is disposed between the first chamber and the second chamber to prevent fluid communication between the first chamber and the second chamber. The seal layer can be operable to be breached by a brewing pin such that the brewing pin is received in the second chamber. The second beverage material can then be removed from the beverage pod via the brewing pin.

15 Claims, 10 Drawing Sheets

FIG. 1A

PRIOR ART

FIG. 1B

PRIOR ART

BEVERAGE POD

CROSS-REFERENCE TO RELATED APPLICATION(S)

This application claims priority benefit to U.S. Provisional Patent Application No. 63/022,163, filed in the U.S. Patent and Trademark Office on May 8, 2020, and U.S. Provisional Patent Application No. 63/051,665, filed in the U.S. Patent and Trademark Office on Jul. 14, 2020, each of which is incorporated herein by reference in its entirety for all purposes.

FIELD

The present disclosure relates to a beverage pod such as, for example, a compostable beverage pod for single-serve use. The present disclosure further relates to beverages comprising a dry beverage material and a liquid beverage material, such as, for example, a coffee brewed from coffee grounds with a liquid additive, such as alcohol, creamer, nutritive oil, or some other liquid additive.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Single-serve beverage pods have become a dominant method for serving beverages, especially hot beverages, in a variety of settings such as homes, offices, waiting rooms, hotel rooms and lobbies, and other places where people consume beverages. The rapid growth of single-serve beverage pods is driven by consumer preference for convenient, quickly prepared beverages in single-portion quantities, in a variety of flavors, beverage types (coffee, espresso, decaffeinated coffee, tea, decaffeinated tea, cider, hot cocoa/chocolate, bone broth, and even alcoholic beverages, such as, for example, Irish Coffee, Hot Toddy, Hot Buttered Rum, etc.). Even within a beverage type, such as coffee, there may be a plurality of roasts and associated roasters, flavor profiles, flavor additives, caffeine strengths, location or locations of origin, etc.

The convenience and variety of single serving beverage pods allows and encourages consumers to prepare and consume a plurality of beverages throughout the day. This pattern of consumption causes the rapid accumulation of used beverage pods wherever they are consumed. Due to the nature of single-serving beverage pods, a considerable amount of packaging waste is produced per beverage consumed compared to preparing beverages by traditional means, such as, for example, preparing a plurality of servings at once using bulk ingredients. Packaging waste, according to the United States Environmental Protection Agency (EPA), defines containers and packaging as products that are assumed to be discarded the same year the products they contain are purchased. The EPA further estimates that the majority of the solid waste are packaging products. Packaging waste contributes significantly to global pollution, the introduction of contaminants into the natural environment that cause adverse change, which poses a health risk many forms of life, including humans, other animals, plants, fungi, etc.

Single-serve beverage pods typically comprise several components made of various materials. The typical components of a single-serve beverage pod include, at least, a container, typically made from plastic such as polyethylene, a filter, typically made from plant fiber such as abaca fibers or other natural and synthetic fibers, and a container lid, typically made from food-grade aluminum foil, which is also commonly printed upon to include product labelling. Some beverage pods do not contain a filter, typically because the beverage material is readily soluble in hot water (such as, for example, hot cocoa). The container will usually comprise an opening on the top of the container, and a hollow cavity within which and across which a filter may be disposed. The container may also comprise an opening at on the bottom container. After the filter and beverage material are inserted into the container, the lid is then typically sealed over the container opening or openings. The sealed lid typically provides an airtight seal, preventing the exchange of gases between the environment and the interior of the container, thus preventing oxidation and/or spoilage of the beverage material. In beverage pods that comprise a filter, the filter may separate the container into two chambers: a first chamber occupying the space within the container between the filter and the opening of the container, the first chamber for holding dry beverage ingredients such as, but not limited to, coffee, tea, or cocoa, for a single beverage serving; and (ii) a second chamber occupying the space within the container between the filter and the base of the container, the second chamber being on the opposite side of the filter to the first chamber. The purpose of the second chamber is typically to provide a space in which a fluid extractor of a beverage brewing device may be inserted into the bottom of the container, entering the second chamber and allowing the extraction of fluid from the pod without the fluid extractor entering the first chamber, such that fluid must flow through the beverage material and the filter before exiting the pod via the fluid extractor. However, the presence of the second chamber may significantly reduce the space within the container that can be occupied by beverage medium. This may be problematic as the total amount of beverage material disposed within the container may significantly contribute to the final concentration of the beverage, typically measured in Total Dissolved Solids (TDS). It may be advantageous to minimize the volume of the second chamber in order to maximize the volume on the third chamber, thereby maximizing the total volume available for beverage material. However, the fluid extractor is typically comprised of a sharp, hollow needle-like piercing element designed to easily pierce through the bottom of the container, such that if the second chamber is reduced in size, the fluid extractor may penetrate or damage the filter, allowing the beverage material to exit the first chamber, and ultimately exit the pod via the fluid extractor. Thus, in the event the fluid extractor penetrates or damages the filter, the beverage material may be transported into the final beverage, which may be undesirable to consumers (such as, for example, the presences of coffee grounds in a prepared cup of coffee) and may potentially damage the beverage brewing machine (for example, by way of clogging the fluid extractor with beverage material).

The cover is disposed over the opening of the container (which may be, for example, over the top of the container, and/or bottom of the container), and keeps the dry beverage ingredients within the container, as well as providing an airtight seal to prevent the oxidation and other types of degradation of the container's contents. In practice, a single-serving beverage pod is placed into a compartment of a brewing machine. The machine is activated such that a fluid injector penetrates the cover of the pod and a fluid extractor penetrates the base of the pod (which may also be a cover). The fluid injector injects a brewing medium (e.g. hot water) into the first chamber for extracting beverage components from the ingredients. The brewing medium containing the extracted beverage components percolates through the filter and into the second chamber. The brewing medium containing the extracted flavours is then extracted by the fluid extractor and finally dispensed as a drinkable beverage.

Currently, the container of a beverage pod for single-serve use is typically made from petroleum-based plastic materials which are neither biodegradable nor compostable. In some cases, the container may be made of petroleum biodegradable materials, such as Polybutylene adipate terephthalate (PBAT). While these materials may eventually biodegrade, they are not desirable for use in home or industrial composting settings, as they may pollute the compost with petroleum residue, microplastics, and other chemicals that may not be desirable for compost. Composting is the mixing of various decaying organic substances, such as dead plant matter, which are allowed to decompose to the point that various waste products of the composting process provide nutrients to be used as soil conditioners/fertilizers. Composting can be aerobic, anerobic, and/or vermicomposting, depending on the environment in which the compost is prepared. Aerobic composting is the decomposition of organic matter by microbes that require oxygen to process the organic matter. The oxygen from the air diffuses into the moisture that permeates the organic matter, allowing it to be taken up by the microbes. Anerobic composting is the decomposition of organic matter by microbes that do not require oxygen to process the organic matter. To be anerobic, the system must be sealed from the air, such as with a plastic barrier. Anerobic compositing produces an acidic environment to digest the organic material. Vermicomposting is the decomposition of organic matter by worms and other animals (such as soldier flies). A portion of the organic matter is converted to vermicast, or castings from the worms or other animals. The breakdown of the organic matter into vermicast yields an effective soil conditioner and/or fertilizer.

The cover of a beverage pod is typically made of a metal foil (e.g., aluminum) or a metal foil laminate which is glued to the top of the container. Generally, neither the metal foil of the cover nor the glue affixing the cover over the opening of the container is biodegradable, compostable or made from readily renewable resources. As a result, non-biodegradable and non-compostable beverage pods typically end up in landfills, thereby at least contributing to environmental concerns associated with disposal of trash. This may be especially problematic due to the fact that traditional means of brewing beverages, e.g., using solely beverage material and filter material, or a filtration device (such as a French press, or a wire mesh filter) may yield a completely compostable waste product (e.g., spent coffee grounds and potentially a used paper filter).

Attempts have been made to recycle plastic beverage pods in some cases. Recycling has many issues which effect the efficacy and practicality of these programs. The first is collection and transportation. Collection largely requires voluntary compliance by consumers. Some deposit programs encourage consumers to return recyclable materials, however this accounts for very few recyclable materials. Collection is further complicated by the need to further transport the materials to a facility which can process them. Many of these facilities are run by municipalities as recycling operations frequently lack economic viability without government subsidies. Recycling of plastics and other materials is further complicated by cross contamination and downcycling. Cross contamination is the presence of foreign materials not desired in the end product and can include materials such as other non-recyclable waste, or other recyclable wastes not compatible with the desired recycled material which can include other plastics. This requires sorting and cleaning of materials. This process can be partially automated; however, it also requires manual sorting and inspection which adds cost, reduces the amount of material that can be processed and inevitably results in a less pure product than when using virgin material. This frequently results in downcycling.

Downcycling is the term used to describe the reduction of quality in recycled materials compared to materials prior to being recycled. Impurities introduced during processing, from non-recyclable waste that could not be removed, or from other plastics and materials can make the resulting material unsuitable for use in their original applications. As such, the applications for recycled materials, especially plastics, are limited, as is the number of times that plastics can be recycled.

Beverage containers, such as instant beverage cups or pods, are particularly difficult to recycle. Not only do they have non-recyclable material contained within them that would first need to be removed, they are frequently comprised of at least two different materials, such as a plastic cup and an aluminum foil lid. When the lid is made of plastic, it is often a different type than the cup, and would require separation prior to processing when being recycled. This increases the complexity of the recycling operation, requiring at least three separate streams for each type of refuse, each requiring their own preparation. Furthermore, the small size of these beverage pods creates a disproportionate amount of effort required to recycle a small amount of material. The separation of materials would ideally be performed by the consumer prior to recycling, however, this inconvenience will inevitably result in consumers recycling the beverage containers without proper preparations, or failing to recycle the container at all, electing to discard the container as trash. One of the major advantages of using beverage pods is consumer convenience, such that a beverage can be prepare by simply inserting a pod into a machine that performs all other brewing functions. It is therefore undesirable to instruct consumers to disassemble and sort various materials from the beverage pod, and due to the diminutive size of beverage pods, this may not be physically possible for consumers without fine motor skills necessary to disassemble such an item. The result is a required step of preprocessing the containers before they can be recycled to ensure the materials are separated and the recyclable material sufficiently cleaned.

Plastics are traditionally sourced from petroleum. They are processed with chemicals to create polymers which can then be formed into shapes. Such polymers that are heated to be formed and then hold their shape when cooled are called thermoplastics. Many of the chemicals used to produce these polymers are inherently toxic and can leech into the contents. This is why few types of plastics are approved for use with foods. Some materials may be safe storing some types of food products, such as dry goods, however when a solvent is introduced, the chemicals in the plastic can go into solution. In the past, some plastics that were previously approved for use with foods have been found to leech chemicals, such as BPA (Bisphenol A). Other chemicals that can be found in plastics include thalates, antiminitroxide, brominated flame retardants and poly-fluorinated chemicals. Depending on the chemical and the manner in which the plastic is being used, it can cause problems including irritation in the eye, vision failure, breathing difficulties, respiratory problems, liver dysfunction, cancers, skin diseases, lung problems, headache, dizziness, birth defects, as well as reproductive, cardiovascular, genotoxic and gastrointestinal issues.

There has been a push from some governments to mandate composting and increase the amount of recycled material to reduce the amount of waste being incinerated or buried in landfills. Some laws such in the European Union, set specific targets, such as 65% of waste recycled by 2035. In the United States, there is no national law, but roughly half of states have some form of recycling law and municipalities may further add to these laws resulting in a varying patchwork of regulations and mandates. Some laws are very limited, requiring that some bottles and cans be recycled. Many of these states also add deposits to bottles, adding monetary value and incentive to returning them for recycling. Others require only specific recyclable materials be recycled, while others may be permitted to be discarded in the trash. Some states go further, mandating that compostable waste be disposed of properly, either in a home composter, or via an industrialized composting operation.

A further complication to composting plastics is that not all plastics break down the same. Some plastics, whether petroleum based or bioplastics, which originate from biomass, are biodegradable. Only a small subset of these are also compostable. The distinction lies in how quickly the plastic breaks down, and whether the process of degradation releases harmful chemicals into the environment. Compostable plastics typically degrade within 12 weeks, wherein biodegradable plastics will typically break down within 6 months. Ideally, compostable plastics would break down at the same rate as common food scraps, about 90 days.

Another class of plastics are OXO-degradable plastics. These are different than biodegradable plastics in that they are traditional plastics with additional chemicals which accelerate the oxidation and fragmentation of the materials under UV light and/or heat. This allows the plastics to break down more quickly, however the result is pollution from microplastics, as the plastic molecules themselves do not degrade any faster than their traditional plastic counterparts. There have been efforts in some jurisdictions to ban these plastics.

Single serving beverage pods, most commonly for coffee, have become incredibly popular, with 59 billion being sold in 2019. Over 95% are still plastic and aluminum—that is 56.05 billion capsules going to landfill in 2018.

BRIEF DESCRIPTIONS OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Disclosed herein is a single-serving beverage pod that provides two chambers. The beverage pod includes a first chamber operable to contain a dry beverage material and a second chamber operable to contain a second beverage material which may be a liquid material.

Coffee is often only one ingredient in a popular beverage, such as when it is mixed with whiskey in an Irish coffee. Single serving beverage pods have limited if any ability to produce such beverages automatically. The current art only allows for the creation of a drink with multiple ingredients when the beverage medium is a dry, such as a drink powder, or completely liquid, such as a concentrated syrup.

It is therefore desirable to create a single serving beverage pod that allows for the creating of a mixed drink, in which the two ingredients in the drink can be stored not in contact with each other, so as to allow the beverage materials to be in their desired form, instead of a concentrated, powder or extract, while also making the beverage pod in a compostable format so as to minimize the environmental impact of the product. There exists a need for a beverage pod capable of containing both dry and liquid ingredient which remain segregated until such time that they are brewed into a desired beverage.

Figure 1A:
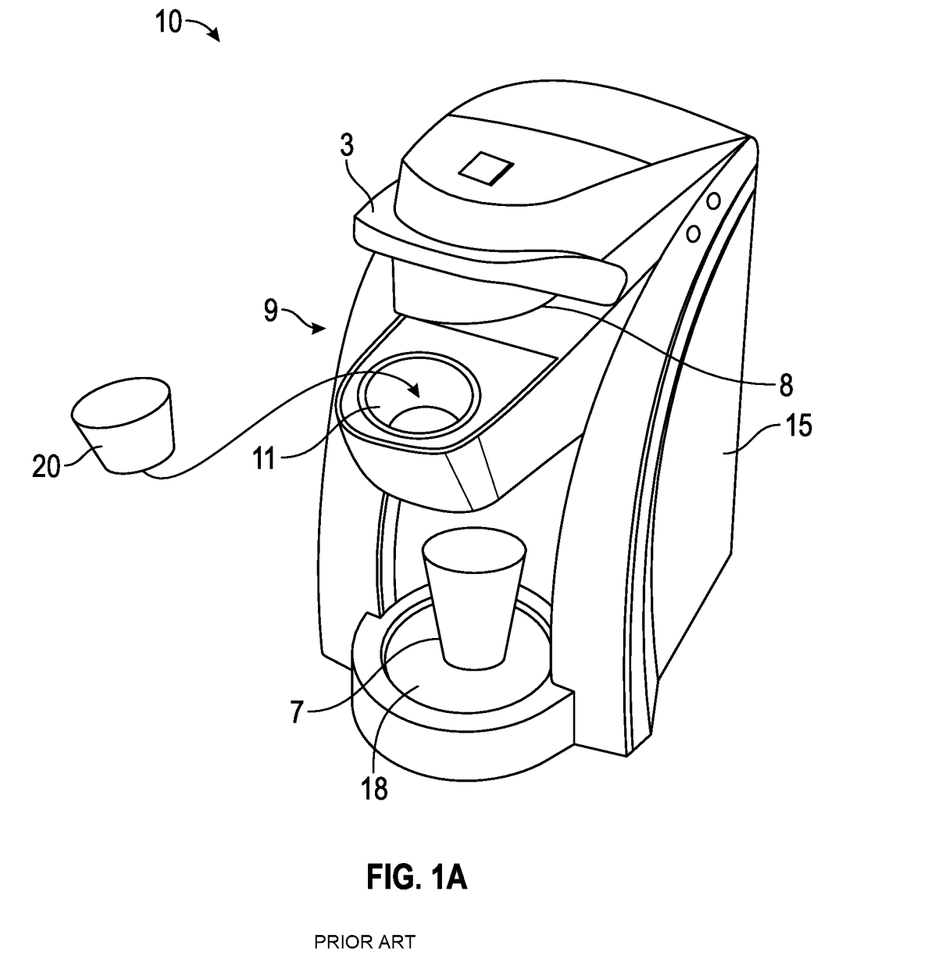
FIG. 1A illustrates an example beverage brewing system.

FIG. 1A illustrates a beverage brewing system 10 operable to brew a beverage. The beverage brewing system 10 includes a beverage brewing machine 3 and a beverage pod 20. The beverage brewing machine 3 is operable to receive the beverage pod 20 and may be used to form any suitable beverage, such as tea, coffee, or other infusion-type beverages. Beverages may be formed from a liquid and/or dry materials, for example to make soups, juices or other beverages made from dried materials, other materials. The beverage brewing machine 3 can create a beverage that is deposited into a user's cup 7. In at least one example, the user can position the cup 7 onto a platform 18. In some examples, the user may position the cup 7 on a table top. The beverage pod 20 can be inserted into a pod holder 9 which has a brewing chamber 11 operable to receive the beverage pod 20. In at least one example, the beverage pod 20 may be manually or automatically placed in the pod holder 9. A cover 8 can at least partially cover the brewing chamber 11 to at least partially enclose the beverage pod 20 in the pod holder 9 in which the beverage pod 20 is used to make a beverage.

Figure 1B:
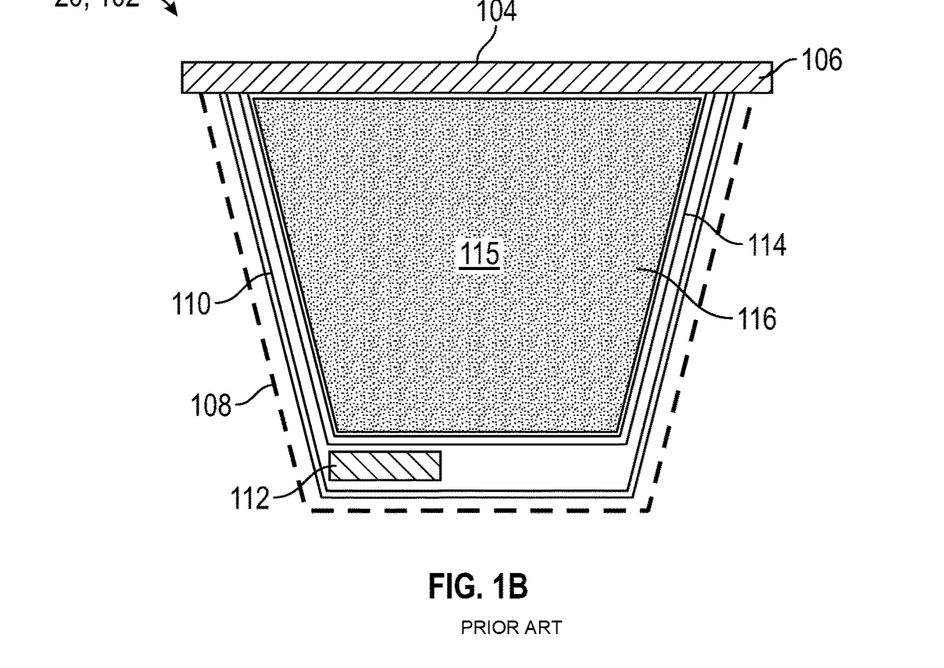
FIG. 1B illustrates an example of a conventional beverage pod.

FIG. 1B illustrates a beverage pod 20, for example an example of a conventional beverage pod 102. Beverage pods 102, or beverage cartridges, are containers, pods, capsules, etc., for use in the beverage brewing machine 3, such as a coffee maker. The beverage pod 20 may include one or more of, a beverage medium 116 that is either soluble or insoluble, one or more filters 114, and a first portion 115 in which liquid is passed into and a second portion 112 through which liquid passes out of the beverage pod 20. In some examples, the beverage pods 20 can be portioned beverage packages that can contain a water-soluble material, to make a drink such a hot chocolate, chai tea, etc. These portioned packages can be pouches as well as pods for beverage brewing machines 3.

The beverage pod 102 can contain a number of components, including lid 104. The lid 104 is operable to close the beverage pod 102 to contain the beverage medium 116 in the first portion 115. The lid 104 can be made of, for example, a foil that is sealed to the beverage pod 20 so as to contain the beverage medium 116. A compostable lid 104 may be comprised of, for example a spun bond PLA web film (which may contain, for example, a proportion of PHA), a cellulose paper film, etc. The pod bond 106 is the connection between any two of the lid 104, outer shell 108, and/or pod interior 110. The pod bond 106 can be mechanical or chemical, and such as adhesives, heat sealing, ultrasonic welding, etc. The pod bond 106 can be in one place or separately depending upon the use case. The pod bond 106 can include a filter bond that binds the filter medium to a portion of the beverage pod 20, such as by ultrasonic welding, adhesives, thermal sealing, etc.

A pod exterior 108 is the outer shell of the beverage pod 20. The exterior 108 can be made of plastic (especially compostable plastic, such as PLA, PHA, or combinations thereof), cellulose, etc. The pod exterior 108 can have similar properties to other thermoplastic polymers such as polypropylene (PP), polyethylene (PE), or polystyrene (PS). This allows it to serve as a biodegradable alternative for coffee pods. In some examples, the pod exterior 108 can also be made from polyhydroxyalkanoates (PHAs), which are a biodegradable polyester produced through bacterial fermentation of sugar or lipids. The pod exterior 108 can be used as alternatives to other synthetic plastics. The mechanical properties of PHAs can be modified for a given use case by blending it with other biodegradable polymers, such as PLAs. They can also be made from poly(L-lactide) (PLLA), which is a polymer that is also biodegradable and compostable. The material may be used to form various aspects of the beverage pod 20. PLLA is also readily renewable, typically made from fermented plant starch such as from corn, cassava, sugarcane, or sugar beet pulp. Cellulose fibers are fibrous materials made from plant materials such cotton, flax, wood pulp, etc. Cellulose fibers can provide a biodegradable filter material that could be used in coffee pods. Other materials that are biodegradable plastic alternatives include petroleum-based plastics such as, Polyglycolic acid (PGA), Polybutylene succinate (PBS), Polycaprolactone (PCL), Polyvinyl alcohol (PVOH), and/or Polybutylene adipate terephthalate (PBAT).

In some examples, beverage pods 20 can also contain a pod interior 110 that is separate from a filter 114, in beverages that have an insoluble beverage material such as coffee. The pod interior 110 can be used for a number of purposes, including, providing material properties such as structural integrity (e.g., provide addition strength to resist the pressure of liquid injection in the process of brewing a beverage, which may crack or otherwise compromise the beverage pod 20), and/or altering the biodegradability or rate of the beverage pod 20. A registration element 112, or faceplate, is a solid structure integrated into a beverage pod 20 that prevents the brewing pin 126 (shown in FIG. 1C) from creating a path for the insoluble beverage material from inside the filter 114 to the outlet. In some examples, the pod interior 114 may include integrated features to act as a registration element 112, removing the requirement for a discrete component.

The filter 114 can be a medium, such as spun bond PLA web, paper (cellulose), cloth or metal, that is used to prevent an insoluble beverage material 116 from leaving the beverage pod 20 and entering the beverage brewing machine 3 or the beverage. Filters 114 can be symmetrical (e.g., fluted), or asymmetrical (e.g. pleated).

Beverage material 116 is the material used to produce a brewed beverage, such as coffee grounds, tea, or a mix beverage where the beverage material is soluble, such as hot chocolate. Beverage material 116 may include any flavorings, nutritional content (e.g., any oils, nutritional supplements, active ingredients such as pharmaceuticals, cannabinoids, etc.), alcohol, coloring, or any other composition which has an effect on the final beverage.

Figure 1C:
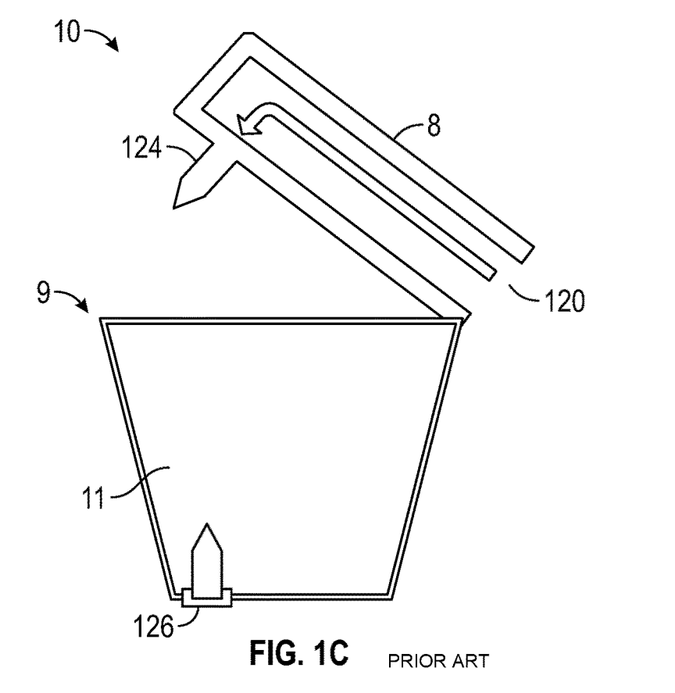
FIG. 1C illustrates a schematic view of a portion of a beverage brewing machine.

Referring to FIGS. 1A, 1B, and 1C, beverage brewing machines 3 for brewing portioned beverages from pre-packed beverage pods 20 exist for a variety of beverages made from a beverage material 116 that is either insoluble, such as coffee, or soluble, such as hot chocolate. A beverage brewing machine 3 can contain many other components, such as, for example, a heating element, a liquid reservoir or plumbing component, a liquid pump, an exterior chassis, a controller for the brewing process, a display or indicator lights and sounds, a user interface including buttons or a touchscreen, a tray to catch spillage, etc. For the purposes of description, the beverage brewing machine 3 contains all components necessary to accomplish the beverage brewing process, though specific reference to beverage brewing machine components may only be made to those components which come into direct contact with the beverage pod 20, such as the brewing chamber 11, a fluid injecting component 124, and a brewing pin 126. The beverage brewing machine 3 can contain a fluid source 120 that supplies the liquid, which may be water, to the brewing machine 3 for producing the desired beverage. A cover 8 can be opened to allow a new beverage pod 20 to be added to the beverage brewing machine 3. The beverage pod 20 can be received in the brewing chamber 11. In some examples, the cover 8 contacts the fluid source 120 to the fluid injecting component 124, but the fluid source 120 does not have to be provided in the cover 120. A fluid injecting component 124 can be operable to breach the lid 104 and be in fluid communication with the first portion 115. In some examples, the fluid injecting component 124 can include a piercing component to pierce the lid 104. The fluid injecting component 124 can provide a liquid, typically hot water, to mix with the beverage medium 116 to create the beverage. A brewing pin 126 can be operable to breach the bottom of the beverage pod 20 to allow the brewed beverage to leave the beverage pod 20 and/or the brewing chamber 11. In some examples, the brewing pin 126 can be operable to breach the beverage pod 20 through the second portion 112. The second portion 112 may be located opposite the first portion 115 in relation to the filter 114 such that the beverage can be extracted without the beverage material 116. In some examples, the brewing pin 126 may pierce or deform other components of the beverage pod 20 to breach the beverage pod 20. The brewing pin 120 can be fluidly coupled to an outlet through which the beverage can be deposited into the cup 7.

Figure 2A:
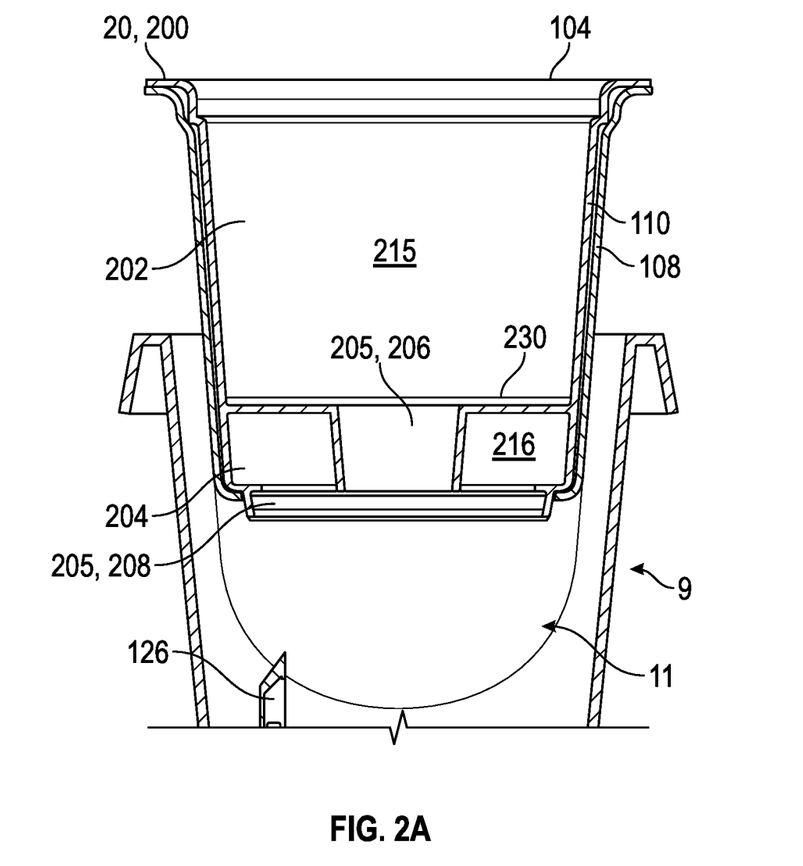
FIG. 2A illustrates an example beverage pod.
Figure 2B:
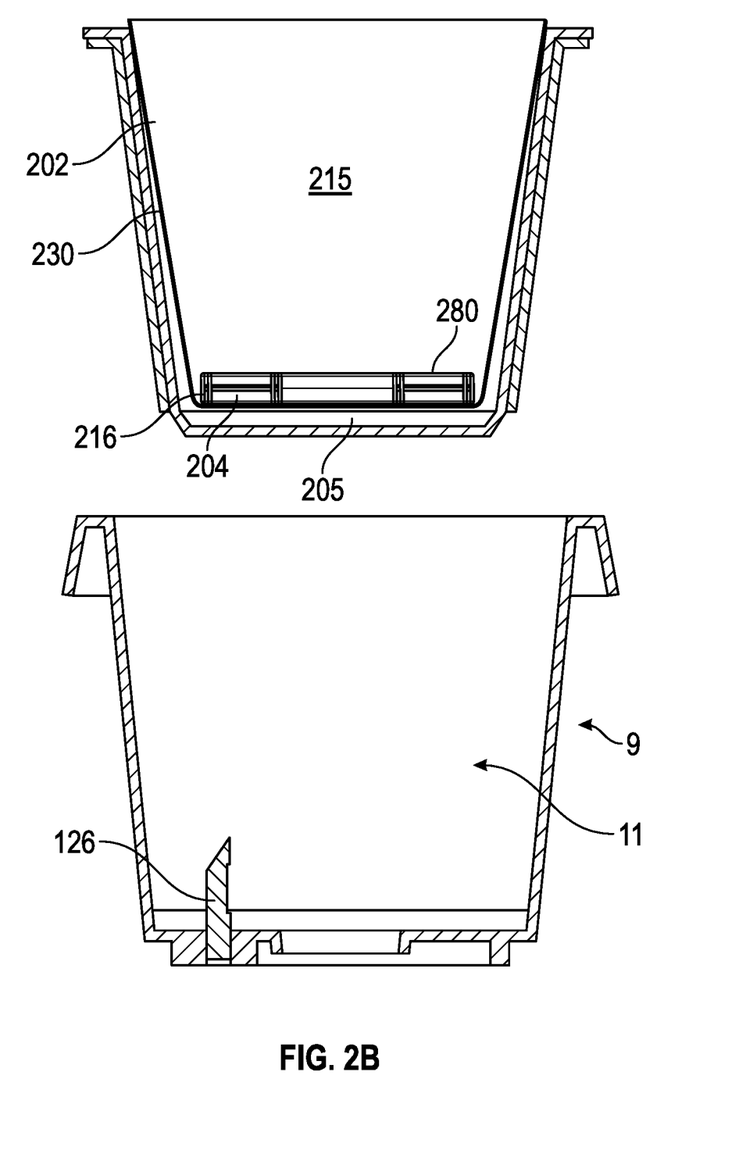
FIG. 2B illustrates another example of a beverage pod.

FIGS. 2A and 2B illustrate the beverage pod 200 that includes at least two separate beverage materials that can be combined when deposited in the user's cup 7. The beverage pod 200 can include a first chamber 215 operable to contain a dry beverage material 202. The dry beverage material 202 can be used to combine with the liquid, for example water, to create a beverage. In some examples, the dry beverage material 202 can include tea leaves, coffee grounds, or any other suitable dry beverage material 202 that can be steeped or dissolved when in contact with the liquid from the fluid injection component 124.

A second chamber 216 can be operable to contain a second beverage material 204. The second beverage material 204 can include a liquid material, for example, an alcohol, milk or other creamers, MCT oil, coconut oil, cannabinoid oil (e.g., CBD oil), other fats and lipids such as grass-fed butter (popular in beverages such as "bulletproof coffee"), liquid sweeteners such as maple syrup, honey, other flavoring (such as liquid flavor shots, e.g., French vanilla, which are popular in brewed beverages), other nutraceutical ingredients such as herbal tinctures, and/or any other liquid beverage additive. In at least one example, for example as illustrated in FIGS. 2A and 2B, the second chamber 216 can be substantially a circular or toroidal shape.

While FIGS. 2A, 3, and 4A-5B illustrate that the second chamber 216 and the first chamber 215 share the same side wall, in some examples, to more easily manufacture the beverage pod 200, the second chamber 216 can be prepared as a separate, discrete component (filled with second beverage material 204 and then sealed) and then inserted into the beverage pod 200. This can apply also to the examples shown in FIGS. 2B and 5C.

In at least one example, as illustrated in FIG. 2A, the first chamber 215 can be positioned in the upper portion of the beverage pod 200. For example, the first chamber 215 can be positioned adjacent to the lid 104. In at least one example, the second chamber 216 can be positioned in the lower portion of the beverage pod 200. For example, the second chamber 216 can be disposed in the beverage pod 200 opposite the lid 104 in relation to the first chamber 215. In other words, the first chamber 215 can be positioned between the lid 104 and the second chamber 216.

In some examples, as illustrated in FIG. 2B, the second chamber 216 can be disposed within the first chamber 215. As illustrated in FIG. 2B, both the first chamber 215 and the second chamber 216 are disposed inside of the filter 230. In at least one example, the filter 230 can have a substantially frusto-conical shape that is commensurate with the shape of the beverage pod 200. In some examples, the filter 230 can have any suitable shape such as, but not limited to, a cylinder shape, a polygonal prism, a domed shape, and a combination thereof.

As illustrated in FIG. 2B, a registration element 280 can also be disposed within the first chamber 215. In at least one example, the registration element 280 can be disposed adjacent to the bottom of the filter 230. The registration element 280 can be disposed against the filter 230 opposite the lid 104 in relation to the first chamber 215. In at least one example, the registration element 280 can be welded to the filter 230 so that the filter 230 is operable to be breached (e.g., punctured) by the brewing pin 126 without letting any dry beverage material 202 escape from the first chamber 215.

The registration element 280 can be made of a suitable material to prevent the brewing pin 126 from fully breaching the registration element 280, such as, but not limited to metal, a plastic, or a polymeric material derived from polylactic acid, Ingeo™, or poly-L-lactide . In some examples, the registration element 280 can be made of a material that is biodegradable and preferably, the material is also compostable and fully plant based.

In some examples, the registration element 280 can allow for precise location of the filter 230 to any desired depth within the beverage pod 200. For example, the registration element 280 can allow for more precise positioning so that of the filter 230 can be disposed to a position closer to the bottom of the beverage pod 200 which can increase the volume available for the loading of dry beverage material 202 into the beverage pod 200. In some examples, the registration element 280 can provide more efficient control of the dosing of the dry beverage material 202. For example, since the registration element 280 facilitates the positioning of the filter 230 lower into the beverage pod 200, for a given amount, there would be a reduced likelihood of spillage of dry beverage material 202 over the rim of the beverage pod 200 which minimizes waste of the dry beverage material 202. Additionally, in some examples, the diameter of the registration element 280 can dictate the depth at which the filter 230 can be seated in a typical frustoconically shaped beverage pod 200 and therefore, the registration element 280 can efficiently facilitate the positioning of the filter 230 into the beverage pod 200.

In some examples, the registration element 280 can increase the quality of the brewed beverage because the registration element 280 when subjected to the upward movement of the brewing pin 126 can function similar to a piston that exerts pressure and compresses the dry beverage material 202 in the first chamber 215 to allow for better extraction during the brewing process.

In at least one example, the second chamber 216 can be disposed within the first chamber 215 between the registration element 280 and the filter 230. In some examples, the second chamber 216 can be disposed within a void in the registration element 280 such that the registration element 280 provides separation between the first chamber 215 and the second chamber 216 and subsequently the dry beverage material 202 and the second beverage material 204. By having the second chamber 216 being within the first chamber 215, there is not a need to change the shape of the filter 230.

The second chamber 216 can be positioned within the first chamber 215 such that the brewing pin 126 breaches the filter 230, is received in the second chamber 216, and abuts against or partially punctures the registration element 280. The positioning of the second chamber 216 within the first chamber 215 can allow for more exposure of the second beverage material 204 for a longer time with the liquid (e.g., hot water). Accordingly, the second beverage material 204 can be warmed up to a higher temperature before being released from the second chamber 216. For example, if the second beverage material 204 includes a fatty material such as butter, the exposure to the liquid for a longer time can allow for the butter to sufficiently melt before being released from the second chamber 216. If the second beverage material 204 does not sufficiently melt and/or liquefy, the second beverage material 204 may clog the brewing pin 126.

Referring to FIGS. 2A-2C, in at least one example, the positioning of the first chamber 215 and/or the second chamber 216 can leave a receiving portion 205 that allows the beverage created from the dry beverage material 202, such as brewed coffee or a soluble drink mix, to reach the bottom of the beverage pod 200 (for example, opposite the lid 104) so as to be removed from the beverage pod 200 to the user's cup 7. For example, the bottom of the beverage pod 200 can be pierced so as to allow the created beverage to be removed from the beverage pod 200 by the brewing pin 126.

As illustrated in FIGS. 2A and 2B in which the second chamber 216 is substantially a toroidal shape, the receiving portion 205 can include a middle portion 206 formed in the center of the second chamber 216 and a bottom portion 208. The bottom portion 208 can be disposed in the beverage pod 200 opposite the lid 104 in relation to the second chamber 216. In other words, the bottom portion 208 can be positioned at least partially underneath the second chamber 216, further away from the lid 104. In some examples, for example as illustrated in FIG. 2B, the center of the second chamber 216 can be part of the first chamber 215 to provide a larger first chamber 215 and subsequently more first beverage material 202. In such an example, the receiving portion 205 may only include the bottom portion 208.

The receiving portion 205 can be in fluid communication with the first chamber 215. In at least one example, to prevent the dry beverage material 202 from passing into the receiving portion 205, a filter 230 can be disposed between the first chamber 215 and the receiving portion 205.

In some examples, the receiving portion 205 can be in fluid communication with the second chamber 216. To prevent the liquid material of the second beverage material 204 in the second chamber 216 from interacting with the dry beverage material 202 in the first chamber 215, the beverage pod 200 can include a seal layer 302, as illustrated in FIGS. 3-5B.

Figure 3:
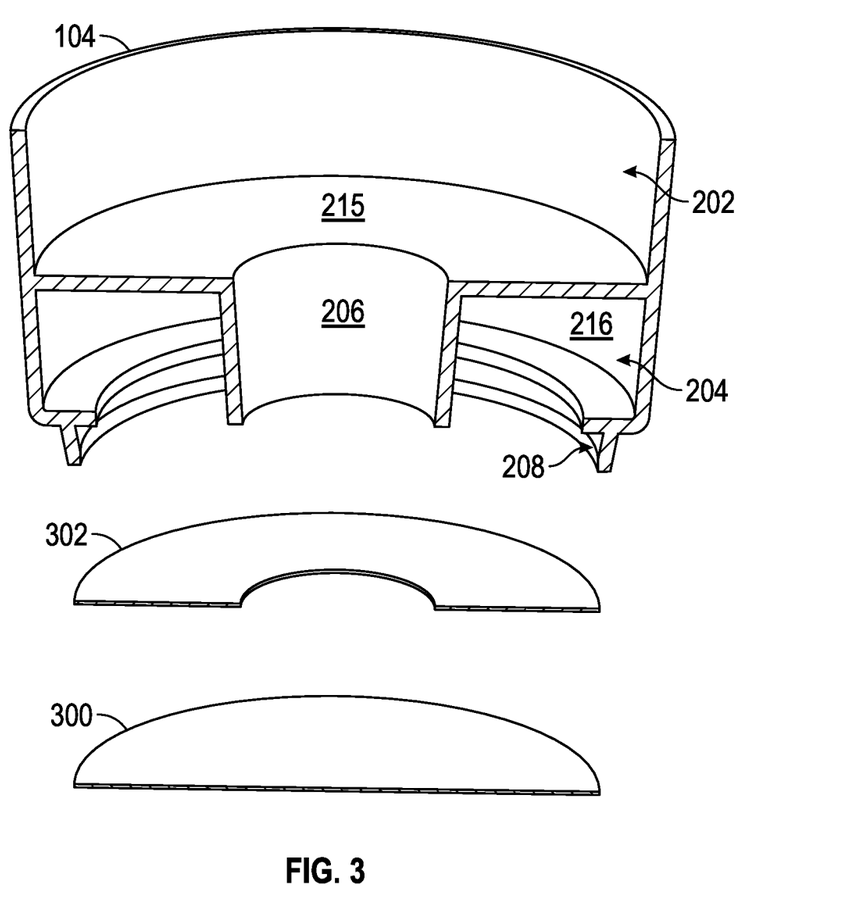
FIG. 3 illustrates a cross-sectional view of a portion of a beverage pod.

Referring to FIG. 3, the beverage pod 200 can include a seal layer 302 that keeps the second beverage material 204 separate from the first beverage material 202, and a bottom layer 300 that is operable to seal away the first beverage material 204, the first beverage material 302, and/or the beverage formed from the liquid and the first beverage material 302 from the external elements until the beverage pod 200 is pierced by the brewing pin 126.

The lower, or exterior, bottom layer 300 is the bottom external portion of the beverage pod 200 opposite the lid 104. The bottom layer 300 can be made from the same material as the rest of the pod exterior 108, or it can be made of a thinner material, such as foil, PLA web, cellulose fiber paper, and/or any combination of materials.

The seal layer 302 can be placed into the beverage pod 200 so as to seal the second beverage material 204 within the second chamber 216 until breached by the brewing pin 126. In at least one example, as illustrated in FIG. 3, the seal layer 302 may not be a full disc, but rather may a hole in the middle. The shape of the seal layer 302 can correspond to the shape of the second chamber 216. In some examples, the seal layer 302 may be any desired shape to correspond to an opening within the second chamber 216 through which the brewing pin 126 may breach to remove the second beverage material 204. As illustrated in FIG. 3, the seal layer 302 can be placed in a position above (e.g., closer to the lid 104) the external facing bottom layer 300 so as to create the bottom portion 208 of the receiving portion 205 that will allow the beverage from the dry beverage material 202 to reach the brewing pin 126 while simultaneously keeping the dry beverage material 202 and the second beverage material 204 separated until placed into the beverage brewing machine 3.

Figure 4A:
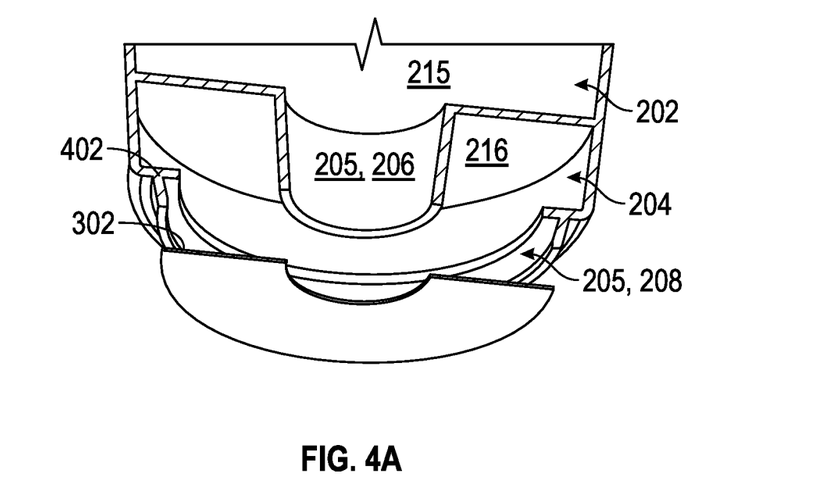
FIG. 4A illustrates a cross-sectional, exploded view of a portion of a beverage pod.
Figure 4B:
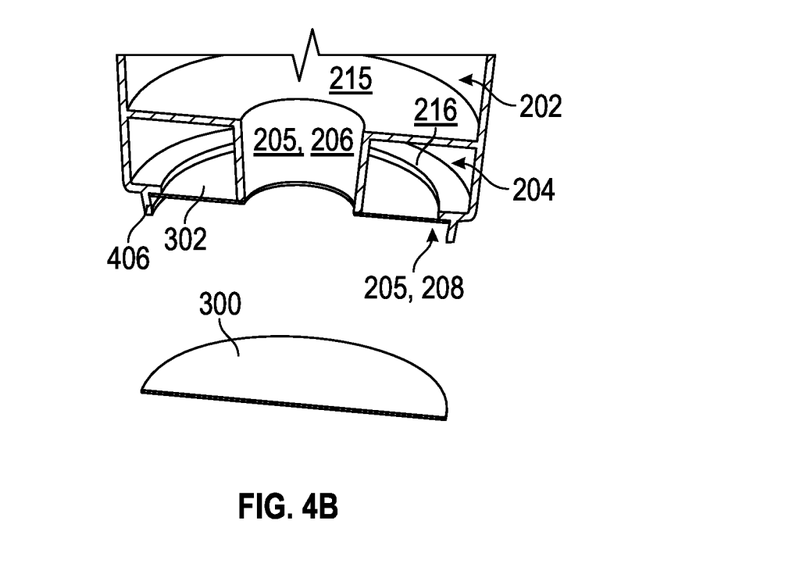
FIG. 4B illustrates a cross-sectional, exploded view of a portion of a beverage pod.

FIGS. 4A and 4B illustrate an example method of integrating the seal layer 302 and the bottom layer 300 of the pod exterior 108 into the beverage pod 200. FIG. 4A shows an isometric, cross-sectional view of the seal layer 302 that keeps the second chamber 216 sealed away from the rest of the beverage pod 200 until placed in the beverage brewing machine 3. The seal layer 302 can be positioned on the bottom end (e.g., away from the lid 104) of the second chamber 216. A seating lip 402 may receive the seal layer 302. In at least one example, the seal layer 302 may be adhered with the seating lip 402. In some examples, the seal layer 302 may sit on the seating lip 402 within the second chamber 216 such that the weight and volume of the second beverage material 204 keeps the seal layer 302 in position. In some examples, the seating lip 402 may include a groove and/or a recess operable to receive the seal layer 302. FIG. 4B shows an isometric, cross-sectional view of the bottom layer 300 of the beverage pod 200 that keeps the contents of the beverage pod 200 protected from air and moisture. The bottom layer 300 can be positioned at seating position 406. In some examples, seating position 406 can include a lip on which the bottom layer 300 sits and/or is adhered to. In some examples, the seating position 406 can include a recess and/or a groove to receive the bottom layer 300.

Figure 5A:
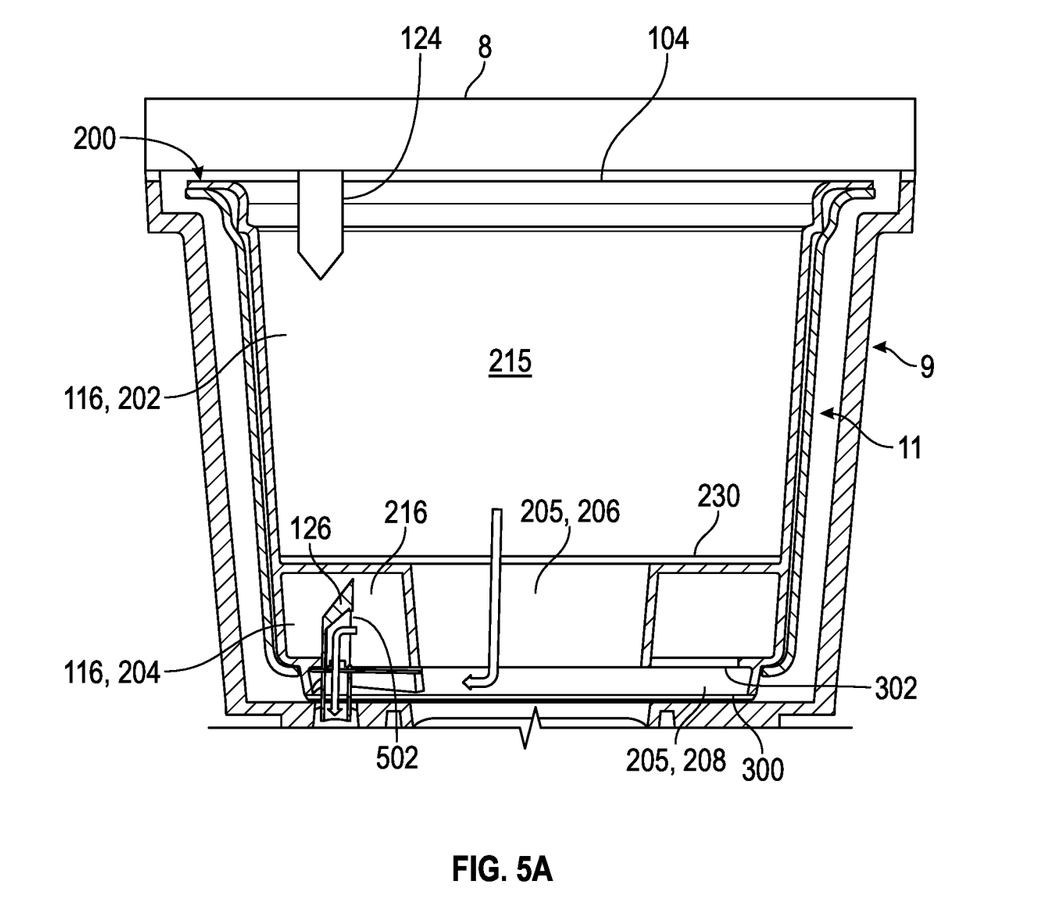
FIG. 5A illustrates a cross-sectional, schematic view of a beverage pod being utilized in a beverage brewing machine.
Figure 5B:
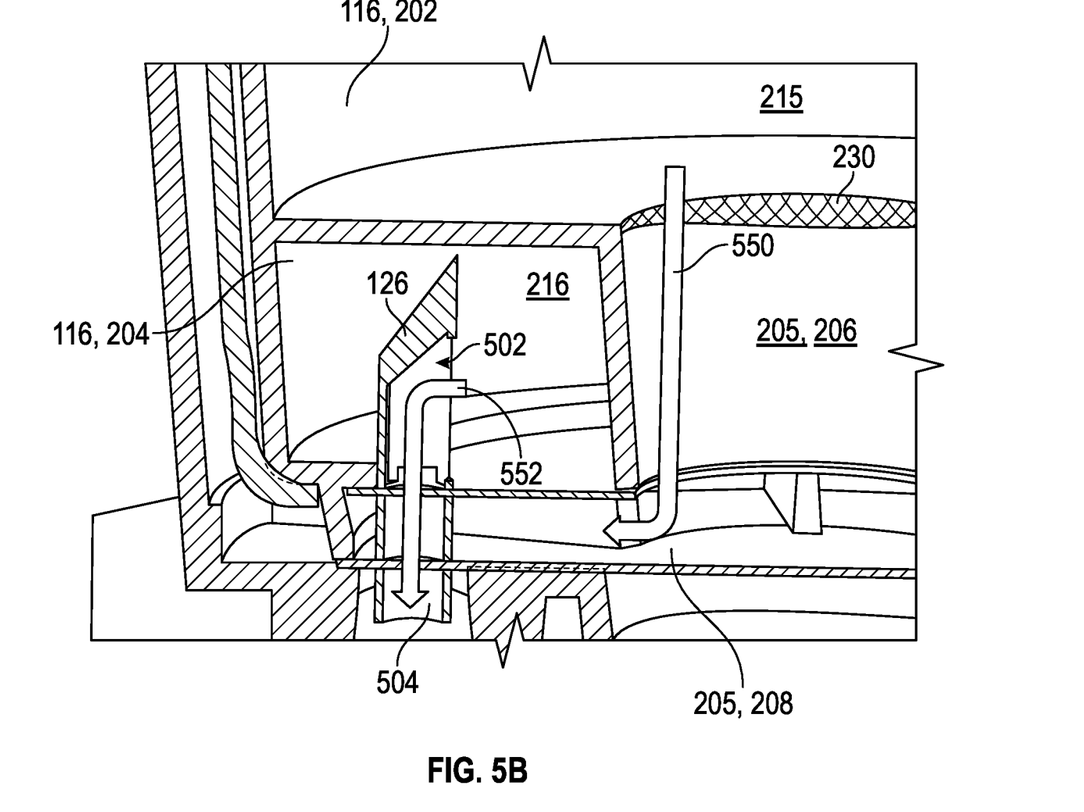
FIG. 5B illustrates an enlarged view of a portion of the beverage pod being utilized in the beverage brewing machine.
Figure 5C:
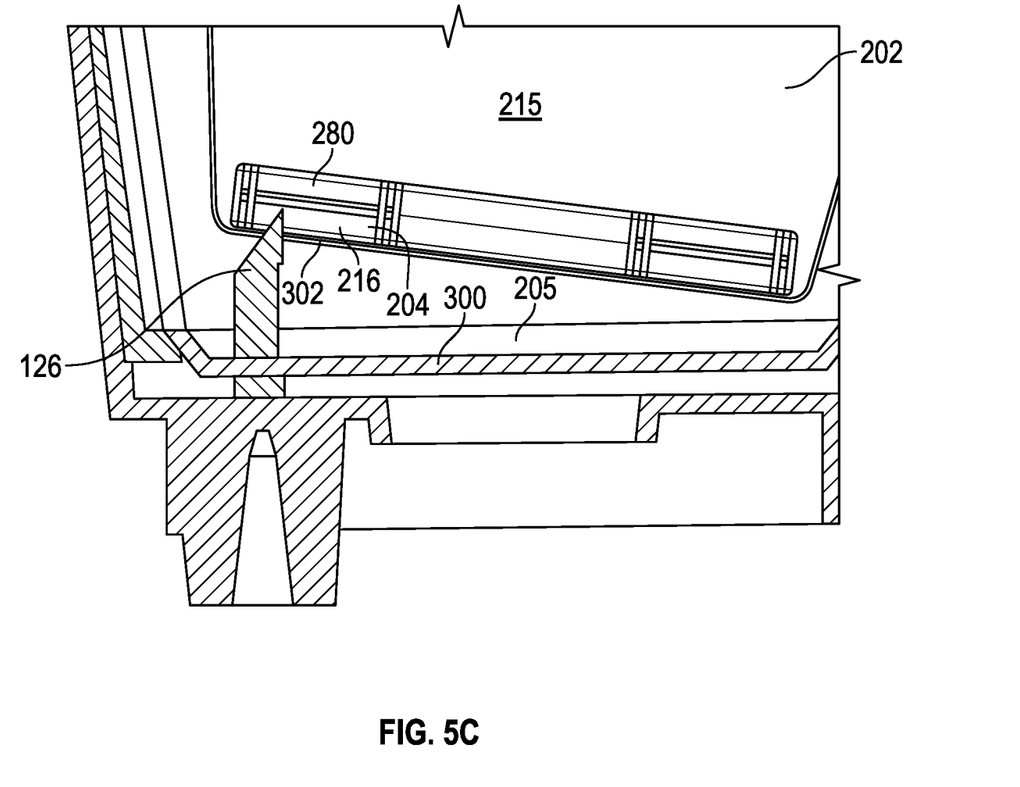
FIG. 5C illustrates an enlarged view of a portion of another example of a beverage pod being utilized in the beverage brewing machine.

FIGS. 5A, 5B, and 5C show the flow of fluid through the beverage pod 200 when it is placed in the beverage brewing machine 3. The beverage pod 200 remains sealed from the external environment until the beverage pod 200 is pierced by the beverage brewing machine 3 in two places. The first piercing of the beverage pod 200 can be performed by the fluid injecting component 124 which breaches the lid 104 and provides the brewing liquid, for example hot water, to the dry beverage material 202 in the first chamber 215. The second piercing of the beverage pod 200 can occur at the bottom of the beverage pod 200 by the brewing pin 126, which serves as the outlet for the brewed beverage to be deposited in the user's cup 7. The brewing pin 126 can include a brewing pin inlet 502 and a brewing pin channel 504 fluidly coupled with the brewing pin inlet 502. The brewing pin inlet 502 can include an opening through which fluid such as the beverage and/or the second beverage material, for example brewed coffee and alcohol (e.g. for an Irish style coffee, a hot beverage containing both coffee and Irish Whisky), can enter into the brewing pin channel 504. The brewing pin channel 504 can be fluidly coupled with an outlet to deposit the beverage and/or second beverage material 204 into the user's cup 7. In order to keep any of the dry beverage material 202, such as coffee grounds, and/or the beverage from leaving the first chamber 215, the only outlet for fluid from the beverage pod 200 is the brewing pin inlet 502.

In at least one example, the second beverage material 204, for example an alcohol, can remain separate from the rest of the contents of the beverage pod 200 until the seal layer 302 is breached by the brewing pin 126 such that the brewing pin 126 is received in the second chamber 216. Once the seal layer 302 is breached by the brewing pin 126, the second beverage material 204 can flow through the brewing pin inlet 502 and out of the second chamber 216, for example along path 552. In some examples, upon the seal layer 302 being breached by the brewing pin 126, the second beverage material 204 can flow into the receiving portion 205. In at least one example, the second beverage material 204 can mix with the beverage. In at least one example, the second beverage material 204 and the beverage can be removed from the beverage pod 200 independently from one another. By keeping the dry beverage material 202 and the second beverage material 204 until the seal layer 302 is breached by the brewing pin 126, the beverage pod 200 can contain both dry and liquid ingredients which remain segregated until such time that they are brewed into a desired beverage.

In at least one example, the seal layer 302 can be breached by the brewing pin 126 piercing the seal layer 302 and being received in the second chamber 216. In some examples, the seal layer 302 can be breached by the brewing pin 126 deforming, tearing, and/or rupturing the seal layer 302. In some examples, the seal layer 302 can be formed to resist puncture. The seal layer 302 can be breached by the brewing pin 126 when the brewing pin 126 enacts a force upon the seal layer 302, and the seal layer 302 is designed to fail at a breakaway portion such as a side wall breakaway, radial breakaway, and/or a center breakaway. A breakaway portion can include a boundary between the beverage pod 200 and the seal layer 302 characterized by a weakened material. The weakened material can be substantially thinner than the rest of the seal layer 302 and/or the beverage pod 200. For example, the breakaway portion may be no more than 0.2 mm in thickness whereas the pod exterior 108 can be at least 0.5 mm thick and the bottom layer 300 can be at least 1.0 mm thick. In at least one example, the seal layer 302 can include wax paper which tears when contacted by the brewing pin 126. In some examples, the breakaway portion can include perforations operable to tear and break upon receiving a predetermined force by the brewing pin 126. In at least one example, the breakaway portion can include a hinge operable to resist separation and instead deforms, for example by bending along the hinge.

In at least one example, the beverage, for example brewed coffee, can flow from the first chamber 215 through the filter 230 into the receiving portion 205 and out of the beverage pod 200 via the brewing pin 126. For example, the beverage can flow through the middle portion 206 of the receiving portion 205 in the center of the beverage pod 200 into the bottom portion 208 of the receiving portion 205 between the seal layer 302 and the bottom layer 300, through the brewing pin inlet 502, and out the beverage pod 200 into the user's cup 7, along the path 506. In some examples, the beverage can sit in the receiving portion 205 for a predetermined amount of time before being removed from the beverage pod 200. In some examples, the beverage can be mixed with the second beverage material 204 before the mix is removed from the beverage pod 200 via the brewing pin 126.

FIG. 5C illustrates the beverage pod 200, for example as discussed above in FIG. 2B, where the second chamber 216 is disposed within the filter 230 and/or the first chamber 215. In such an example, the filter 230 is operable to be breached (e.g., punctured) by the brewing pin 126. After breaching the filter 230, the seal layer 302 can be breached by the brewing pin 126 such that the brewing pin 126 is received in the second chamber 216. The seal layer 302 can be breached by the brewing pin 126 by any suitable manner, for example any of the above-discussed mechanisms. The second beverage material 204 can be released from the second chamber 216 through the brewing pin 126 and/or into the receiving portion 205. The registration element 280 then receives the brewing pin 126, for example by abutting against or partially being penetrated by the brewing pin 126, so long as the brewing pin 126 does not fully penetrate the registration element 280 to allow the dry beverage material 202 from leaving the first chamber 215. In some examples, as illustrated in FIG. 5C, after the brewing pin 126 abuts and pushes up against the registration element 280, the filter 230 can be raised to compress the first chamber 215. Accordingly, the concentration of the beverage can be increased and improved.

Figure 6:
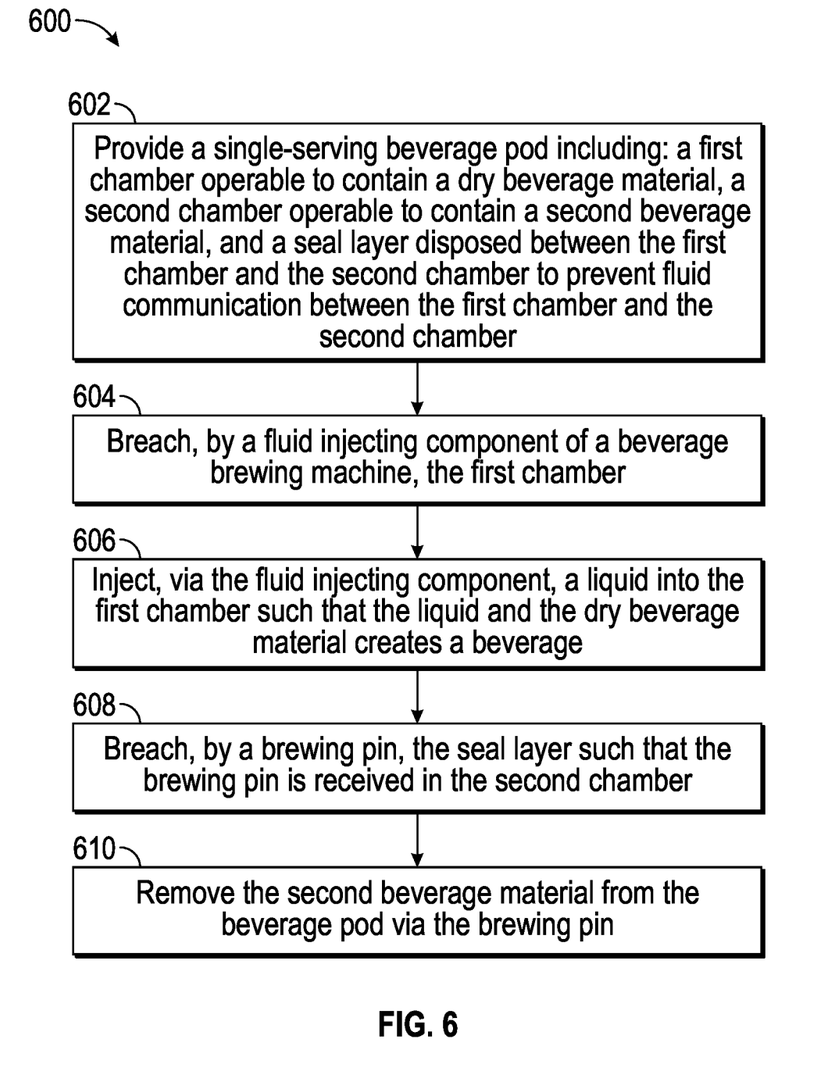
FIG. 6 illustrates a flow chart of a method for brewing a beverage according to the disclosure herein.

FIG. 6 is an example method 600 for brewing a beverage with a beverage pod, in accordance with various aspects of the subject technology. The method 600 is provided by way of example, as there are a variety of ways to carry out the method. The method 600 described below can be carried out using the configurations illustrated in FIGS. 1A-5C, for example, and various elements of these figures are referenced in explaining example method 600. Each block shown in FIG. 6 represents one or more processes, methods or subroutines, carried out in the example method 600. Furthermore, the illustrated order of blocks is illustrative only and the order of the blocks can change according to the present disclosure. Additional blocks may be added or fewer blocks may be utilized, without departing from this disclosure. The method 600 can begin at block 602.

At block 602, a single-serving beverage pod is provided. The beverage pod can include a first chamber operable to contain a dry beverage material, a second chamber operable to contain a second beverage material, and a seal layer disposed between the first chamber and the second chamber to prevent fluid communication between the first chamber and the second chamber. In at least one example, the second beverage material can include a liquid material. In at least one example, the second chamber can be disposed in the beverage pod opposite the lid in relation to the first chamber. In at least one example, at least a portion of the receiving portion can be disposed in the beverage pod opposite the lid in relation to the second chamber. In at least one example, the second chamber can be substantially a circular or substantially a toroidal shape.

At block 604, a fluid injecting component of a beverage brewing machine breaches the first chamber. In at least one example, the beverage pod can include a lid operable to be breached by the fluid injecting component such that the fluid injecting component is received in the first chamber. At block 606, the fluid injecting component injects a liquid into the first chamber such that the liquid and the dry beverage material creates a beverage. In at least one example, the beverage pod includes a receiving portion in fluid communication with the first chamber. The receiving portion can be operable to receive the beverage. In some examples, the beverage pod can include a filter disposed between the first chamber and the receiving portion. The filter can be operable to prevent the dry beverage material from passing into the receiving portion while permitting the beverage to pass into the receiving portion. Accordingly, the dry beverage material may not clog any components removing the beverage from the beverage pod.

At block 608, a brewing pin breaches the seal layer such that the brewing pin is received in the second chamber. At block 610, the second beverage material is removed from the beverage pod via the brewing pin. In at least one example, upon breach of the seal layer by the brewing pin, the second beverage material can pass into the receiving portion, and the second beverage material can be removed from the beverage pod via the brewing pin. In at least one example, the second beverage material is removed via the brewing pin directly from the second chamber. In at least one example, the beverage can be removed from the beverage pod via the brewing pin. In some examples, the second beverage material and the beverage can be removed from the beverage pod after being mixed together. In some examples, the second beverage material and the beverage can be removed from the beverage pod independently from one another.

Numerous examples are provided herein to enhance understanding of the present disclosure. A specific set of statements are provided as follows.

Statement 1: A single-serving beverage pod is disclosed comprising: a first chamber operable to contain a dry beverage material; a second chamber operable to contain a second beverage material; a seal layer disposed between the first chamber and the second chamber to prevent fluid communication between the first chamber and the second chamber, wherein the seal layer is operable to be breached by a brewing pin such that the brewing pin is received in the second chamber, wherein the second beverage material is removed from the beverage pod by the brewing pin.

Statement 2: A beverage pod is disclosed according to Statement 1, wherein the second beverage material is a liquid material.

Statement 3: A beverage pod is disclosed according to Statements 1 or 2, further comprising a lid operable to be breached by a fluid injecting component such that the fluid injecting component provides a liquid to the first chamber, wherein the liquid and the dry beverage material create a beverage.

Statement 4: A beverage pod is disclosed according to Statement 3, wherein the beverage is removed from the beverage pod via the brewing pin.

Statement 5: A beverage pod is disclosed according to Statements 3 or 4, further comprising a receiving portion in fluid communication with the first chamber, wherein the receiving portion is operable to receive the beverage.

Statement 6: A beverage pod is disclosed according to Statement 5, further comprising a filter disposed between the first chamber and the receiving portion, wherein the filter is operable to prevent the dry beverage material from passing into the receiving portion while permitting the beverage to pass into the receiving portion.

Statement 7: A beverage pod is disclosed according to Statements 5 or 6, wherein upon breach of the seal layer by the brewing pin, the second beverage material passes into the receiving portion and is removed from the beverage pod via the brewing pin.

Statement 8: A beverage pod is disclosed according to any of preceding Statements 5-7, wherein the second chamber is disposed in the beverage pod opposite the lid in relation to the first chamber.

Statement 9: A beverage pod is disclosed according to Statement 8, wherein at least a portion of the receiving portion is disposed in the beverage pod opposite the lid in relation to the second chamber.

Statement 10: A beverage pod is disclosed according to any of preceding Statements 1-9, wherein the second chamber is substantially a toroidal shape.

Statement 11: A method is disclosed comprising: providing a single-serving beverage pod, the beverage pod including: a first chamber operable to contain a dry beverage material; a second chamber operable to contain a second beverage material; a seal layer disposed between the first chamber and the second chamber to prevent fluid communication between the first chamber and the second chamber; breaching, by a fluid injecting component of a beverage brewing machine, the first chamber; injecting, via the fluid injecting component, a liquid into the first chamber such that the liquid and the dry beverage material creates a beverage; breaching, by a brewing pin, the seal layer such that the brewing pin is received in the second chamber; removing the second beverage material from the beverage pod via the brewing pin.

Statement 12: A method is disclosed according to Statement 11, wherein the second beverage material is a liquid material.

Statement 13: A method is disclosed according to Statements 11 or 12, wherein the beverage pod includes a lid operable to be breached by the fluid injecting component such that the fluid injecting component is received in the first chamber.

Statement 14: A method is disclosed according to any of preceding Statements 11-13, wherein the beverage is removed from the beverage pod via the brewing pin.

Statement 15: A method is disclosed according to any of preceding Statements 11-14, wherein the beverage pod includes a receiving portion in fluid communication with the first chamber, wherein the receiving portion is operable to receive the beverage.

Statement 16: A method is disclosed according to Statement 15, wherein the beverage pod includes a filter disposed between the first chamber and the receiving portion, wherein the filter is operable to prevent the dry beverage material from passing into the receiving portion while permitting the beverage to pass into the receiving portion.

Statement 17: A method is disclosed according to Statements 15 or 16, further comprising: upon breach of the seal layer by the brewing pin, passing the second beverage material into the receiving portion and removing the second beverage material from the beverage pod via the brewing pin.

Statement 18: A method is disclosed according to any of preceding Statements 15-17, wherein the second chamber is disposed in the beverage pod opposite the lid in relation to the first chamber.

Statement 19: A method is disclosed according to Statement 18, wherein at least a portion of the receiving portion is disposed in the beverage pod opposite the lid in relation to the second chamber.

Statement 20: A method is disclosed according to any of preceding Statements 11-19, wherein the second chamber is substantially a toroidal shape.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A single-serving beverage pod comprising:
   a pod body having a bottom layer configured to be pierced by a brewing pin and having a lid,
   a first chamber operable to contain a dry beverage material;
   a second chamber enclosed within the single-serving beverage pod and spaced apart from the bottom layer, wherein the second chamber is operable to contain a second beverage material and has a substantially toroidal shape;
   a receiving portion in fluid communication with the first chamber, wherein the receiving portion is operable to receive a beverage brewed in the first chamber upon mixture of the dry beverage material and a liquid, wherein the receiving portion includes
      a central region surrounded by the second chamber, and
      a lower lateral region positioned directly between the second chamber and the bottom layer to allow the brewed beverage to flow underneath at least a portion of the second chamber;
   a seal layer disposed between the lower lateral region and the second chamber to prevent fluid communication between the receiving portion and the second chamber, wherein the seal layer is operable to be breached by the brewing pin such that a tip of the brewing pin is positioned in the second chamber, wherein upon breach by the brewing pin, the second beverage material flows out of the second chamber and flows downwardly into the lower lateral region of the receiving portion, wherein the second beverage material mixes with the brewed beverage to form a mixture that flows downwardly away from the single-serving beverage pod via the brewing pin.

2. The single-serving beverage pod of claim 1, wherein the second beverage material is a liquid material.

3. The single-serving beverage pod of claim 1, further comprising the lid operable to be breached by a fluid injecting component such that the fluid injecting component provides the liquid to the first chamber.

4. The single-serving beverage pod of claim 3, wherein the mixture is directed away the single-serving beverage pod via the brewing pin.

5. The single-serving beverage pod of claim 1, wherein the lower lateral region is positioned at least partially underneath the second chamber and above the bottom layer.

6. The single-serving beverage pod of claim 1, further comprising a filter disposed between the first chamber and the receiving portion, wherein the filter is operable to prevent the dry beverage material from passing into the receiving portion while permitting the beverage to pass into the receiving portion.

7. The single-serving beverage pod of claim 1, wherein upon the breach of the seal layer by the brewing pin, the second beverage material flows out of the second chamber and flows into the receiving portion to mix with the beverage in the lower lateral region to form the mixture.

8. The single-serving beverage pod of claim 1, wherein the second chamber is disposed in the single-serving beverage pod opposite the lid in relation to the first chamber.

9. The single-serving beverage pod of claim 8, wherein at least a portion of the receiving portion is disposed in the single-serving beverage pod opposite the lid in relation to the second chamber.

10. The single-serving beverage pod of claim 1, wherein the lower lateral region is positioned at least partially underneath the second chamber and above the bottom.

11. The single-serving beverage pod of claim 1, further comprising a filter disposed between the first chamber and the receiving portion, wherein the filter is configured to prevent the dry beverage material from passing into the receiving portion while permitting the brewed beverage to flow into the receiving portion.

12. The single-serving beverage pod of claim 1, wherein upon the breach of the seal layer by the brewing pin, the second beverage material is allowed to flow out of the second chamber into the lower lateral region.

13. A single-serving beverage pod comprising:
   a first chamber configured to contain a dry beverage material;
   an enclosed second chamber positioned below the first chamber configured to contain a second beverage material;
   a receiving portion in fluid communication with the first chamber, wherein the receiving portion is configured to receive a beverage brewed in the first chamber upon mixture of the dry beverage material and a liquid, wherein the receiving portion includes
      a central region, and
      a lower lateral region;
   a seal layer sealing the second chamber to prevent fluid communication between the receiving portion and the second chamber; and
   a pod body housing the first chamber, the second chamber, and the receiving portion, wherein the pod body includes a bottom spaced apart from the seal layer, wherein the enclosed second chamber is connected to a sidewall of the pod body, has a substantially toroidal shape, and circumferentially surrounds the central region;
   wherein the lower lateral region defines a channel for the brewed beverage to flow away from the central region and toward a brewing pin that has breached the bottom and the seal layer, wherein the second chamber is positioned to allow the second material to flow downwardly past the seal layer breached by the brewing pin and into the lower lateral region.

14. The single-serving beverage pod of claim 13, wherein the seal layer defines a flow-through opening, wherein the central region extends between the flow-through opening and a filter at the bottom of the first chamber.

15. The single-serving beverage pod of claim 13, wherein the seal layer is configured to fail at a breakaway portion when the brewing pin applies a sufficient force to the seal layer.

* * * * *